E. C. DENNERT.
BEVERAGE PREPARING MACHINE.
APPLICATION FILED OCT. 8, 1919.
1,352,435.   Patented Sept. 14, 1920.
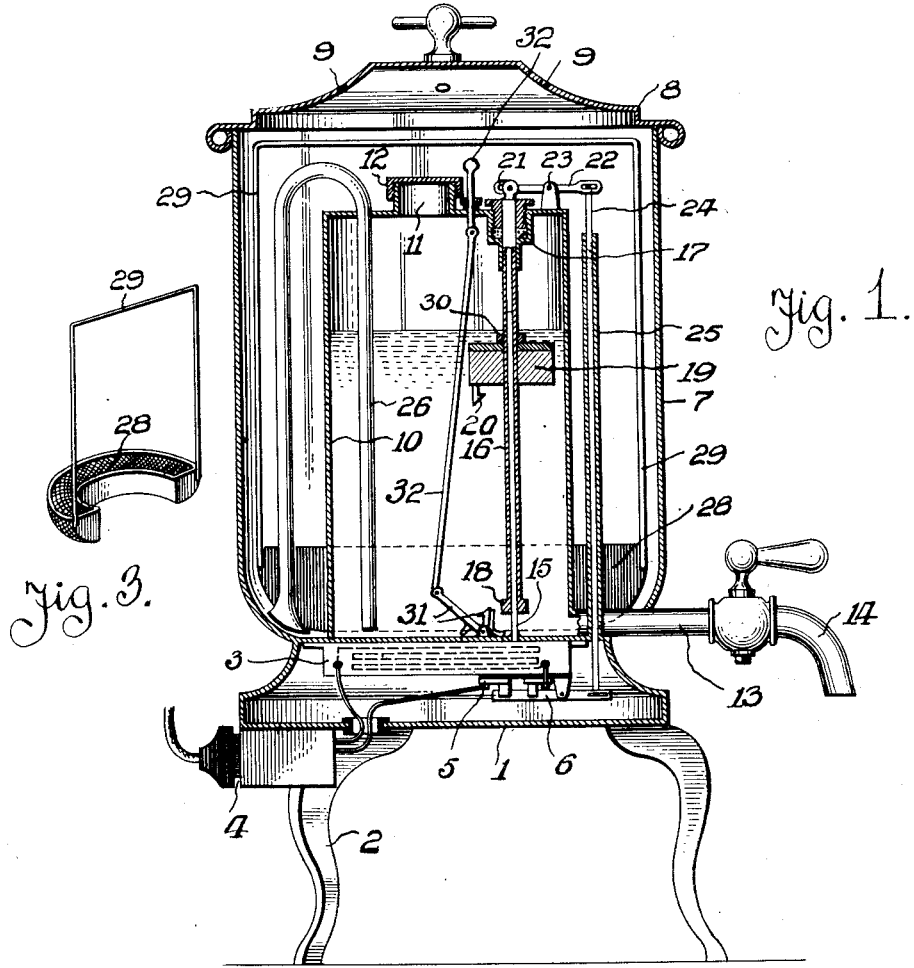
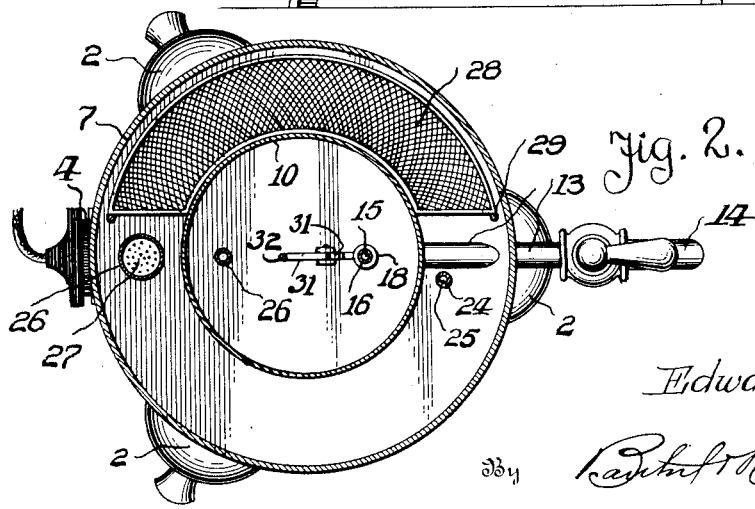
Inventor
Edward C. Deppert,
By
Attorneys

UNITED STATES PATENT OFFICE.

EDWARD C. DENNERT, OF DETROIT, MICHIGAN, ASSIGNOR TO WESTINGHOUSE ELECTRIC AND MANUFACTURING COMPANY, A CORPORATION OF PENNSYLVANIA.

BEVERAGE-PREPARING MACHINE.

1,352,435. Specification of Letters Patent. Patented Sept. 14, 1920.

Application filed October 8, 1919. Serial No. 329,272.

*To all whom it may concern:*

Be it known that I, EDWARD C. DENNERT, a citizen of the United States of America, residing at Detroit, in the county of Wayne and State of Michigan, have invented certain new and useful Improvements in Beverage-Preparing Machines, of which the following is a specification, reference being had therein to the accompanying drawings.

This invention relates to a beverage preparing machine, and has special reference to an electric urn or percolator in which coffee, tea or other beverages may be prepared by using boiling water or a liquid in connection with cereals or essences.

The primary object of my invention is to provide an automatic beverage preparing machine wherein the application of heat is automatically controlled, so that the heat will not be wasted and may also be utilized, at a predetermined period, for producing results in connection with the machine that are also automatic, thus obviating the necessity of any attention on the part of an operator, after once placing the machine in operation. In other words, there is no danger of heat being wasted, or the beverage boiling over or boiling dry.

Another object of this invention is to provide an electric coffee urn or percolator wherein the application of heat for boiling water, is utilized for producing a pressure which transfers the boiling water to a receptacle containing ground coffee or essence, and producing a partial vacuum which transfers the impregnated water to its original receptacle from which it may be withdrawn.

A further object of this invention is to provide an automatic coffee urn wherein electricity is used as a heating medium and the use of current controlled by a float actuated mechanism.

The above and other objects are attained by a mechanical construction that will be hereinafter considered and then claimed, and reference will now be had to the drawing, wherein—

Figure 1 is a vertical sectional view of the beverage preparing machine;

Fig. 2 is a horizontal sectional view of the same, and

Fig. 3 is a perspective view, on a small scale, of a detached cereal or essence container.

In the drawing, the reference numeral 1 denotes a hollow base which may be supported by legs 2 and in the base is an electric heating unit or element 3 electrically connected to a plug or socket, generally designated 4, carried by the base 1, and adapted to permit of an ordinary electric lighting circuit being utilized in connection with the heating unit 3. This heating unit is also electrically connected through a knife switch 5, including a pivoted knife or switch member 6, which is adapted to be automatically actuated.

Mounted on the base 1 is an outer receptacle or casing 7 provided with a detachable cover 8 having vent openings 9.

In the outer receptacle or casing 7 is an inner receptacle or shell 10 which has the top thereof closed and provided with a filling connection or opening 11 normally closed by a cap 12. A side wall of the inner receptacle 10, at the bottom thereof, is provided with an outlet pipe 13 extending through the outer receptacle or casing 7 and provided with a faucet 14.

In the inner receptacle 10, at one side thereof, is a guide post 15 for a tubular float actuated member 16 which has its upper end extending through a stuffing box 17, carried by the top of the inner receptacle. The lower end of the tubular member 16 has a head 18 which limits the downward movement of a float 19 slidable on the member 16, said float having a keeper 20 adapted to automatically engage a pivoted latch 31 on the bottom of the receptacle 10 and hold the float at the lower end of said receptacle. The latch 31 is retracted by a rod 32 extending through the top of the receptacle 10.

The upper end of the tubular float actuated member 16 is loosely connected, as at 21, to an arm 22 fulcrumed on the upper end of the inner receptacle 10, as at 23, and the outer end of said arm is loosely connected to a rod 24 extending through a tubular guide 25 in the outer receptacle or casing 7. The lower end of the rod 24 extends into the hollow base 1 and is loosely connected to the pivoted switch knife or member 6, so that reciprocation of the tubular member 16 on the post 15 causes the switch member 6 to be opened or closed.

The closed upper end of the inner receptacle 10 supports a siphon tube connection which has one end thereof in proximity to the bottom of the inner receptacle 10 and the opposite end thereof in proximity to the bottom of the outer receptacle 7, this end of the siphon tube being flared and provided with a strainer or nozzle shaped sieve 27.

Detachably mounted in the outer receptacle or casing 7 is a cereal or essence container 28, preferably in the form of a semicircular foraminous holder in which ground coffee, tea leaves or other matter may be placed. The container is shaped so as to surround a portion of the inner receptacle 10 and occupy a position on the bottom of the outer receptacle 7, without interfering with the siphon tube 26 or the tubular guide 25. A bail 29 serves as a suitable handle for raising and lowering the container and in some instances the container may be suspended or otherwise supported between the inner and outer receptacles.

To place the machine in operation, water or other liquid which will form the volume or dilutent of the beverage, is placed in the inner receptacle 10 and as the water enters the receptacle the float 19 is raised, providing the keeper 20 has been released by the latch 31. When the tubular member 16 is released, through the medium of the float 19, the weight of the rod 24 coöperates with the flotation of the float 19 against a collar 30 on the member 16 in raising the member 16 and closing the switch 5, so that the electric heating unit or element 3 is immediately placed in operation to heat the water within the inner receptacle 10.

As the water within the inner receptacle 10 is brought to a boiling point, steam is generated in the upper portion of the inner receptacle and the pressure of steam therein forces the water through the siphon tube 26 into the bottom of the outer receptacle or casing 7 where the water saturates the coffee or cereal within the container 28 and is impregnated thereby. As the water in the inner receptacle 10 is transferred to the outer receptacle 7 the float 19 is gradually lowered and eventually impinges upon the head 18 and is locked by the latch 31. When the float 19 strikes the head 18 the tubular member 16 is lowered thereby elevating the rod 14 and opening the switch 5, cutting off the current to the electric heating unit or element 3, so that heat is no longer applied to the contents of the inner receptacle 10. The cooling of the liquid in the bottom of the receptacle 10 or the complete withdrawal of liquid therefrom produces a partial vacuum within the inner receptacle 10 and in consequence of this vacuum the contents of the outer receptacle 7 are siphoned into the inner receptacle 10 in which receptacle the contents remain until withdrawn through the faucet 14.

Since the float 19 is locked in the bottom part of the inner receptacle 10, it cannot actuate the tubular member 16, and consequently the switch 5 remains open until it is again desired to use the machine.

The initial generation of steam in the upper portion of the inner receptacle 10 may start the operation of the siphoning tube 26 until the water in the outer receptacle is on a level with the water in the inner receptacle, when a further generation of steam forces the contents of the inner receptacle completely into the outer receptacle, and it is during the occupancy of the outer receptacle that the water is impregnated by the cereals, extracts or essences suitably held in the outer receptacle. With the siphoning tube 26 constructed to provide a strainer at one end thereof there is no danger of grounds or sediment being carried into the inner receptacle 10 particularly when the cereals are placed in a proper container or cage.

It is thought that the operation and utility of the machine will be apparent without further description, and while in the drawing there is illustrated a preferred embodiment of my invention, it is to be understood that the structural elements are susceptible to such variations and modifications as fall within the scope of the appended claims.

What I claim is:—

1. A beverage preparing machine comprising an inner receptacle adapted to have a liquid heated therein, an outer receptacle adapted to contain an essence, heating means for the liquid in the inner receptacle and adapted to cause the heated liquid to enter the outer receptacle during the application of heat, and return to the inner receptacle when the heat is withdrawn.

2. A beverage preparing machine as characterized in claim 1, wherein a siphonic connection is established between the inner and outer receptacles.

3. A beverage preparing machine as characterized in claim 1, wherein a float actuated mechanism associated with the inner receptacle controls the application of heat.

4. Means for preparing a beverage comprising receptacles adapted to have a liquid transferred back and forth between said receptacles, heating means for one of said receptacles, and automatic means controlling said heating means.

5. Means for preparing a beverage comprising receptacles adapted to have a liquid transferred back and forth therebetween, a siphonic tube connecting said receptacles, and means adapted to produce a pressure to transfer the liquid in one direction and produce a partial vacuum to transfer the liquid in an opposite direction.

6. Means for preparing a beverage comprising inner and outer communicating receptacles adapted to have liquid pass back and forth therebetween, and means adapted to produce a pressure in the inner receptacle to transfer liquid therefrom into the outer receptacle, and produce a partial vacuum in the inner receptacle to transfer liquid from the outer receptacle into the inner receptacle.

7. Means for preparing a beverage as characterized in claim 6, wherein the inner receptacle has an outlet through the outer receptacle.

8. Means for preparing a beverage as characterized in claim 6, wherein means in the inner receptacle controls the first mentioned means.

9. A beverage preparing machine comprising a base, an outer receptacle on said base, an inner receptacle in said outer receptacle having an outlet thereto, a siphonic tube between said receptacles adapted to transfer liquid back and forth between said receptacles, and a heating means in said base for the inner receptacle.

10. A machine as characterized in claim 9, wherein an automatic switch in said base controls said heating means.

11. A machine as characterized in claim 9, wherein reciprocable means in said inner receptacle controls said heating means.

12. A machine as characterized in claim 9, wherein the heating means is in the form of a switch controlled electric element, and float operated mechanism adapted to actuate the switch of said electric element.

In testimony whereof I have affixed my signature in the presence of two witnesses.

EDWARD C. DENNERT.

Witnesses:
KARL H. BUTLER,
ANNA M. DORR.